(12) United States Patent
Li et al.

(10) Patent No.: US 11,388,149 B2
(45) Date of Patent: Jul. 12, 2022

(54) METHOD AND APPARATUS FOR OBTAINING INPUT OF SECURE MULTIPARTY COMPUTATION PROTOCOL

(71) Applicant: ADVANCED NEW TECHNOLOGIES CO., LTD., Grand Cayman (KY)

(72) Inventors: Lichun Li, Hangzhou (CN); Pengfei Ying, Hangzhou (CN); Shan Yin, Hangzhou (CN)

(73) Assignee: ADVANCED NEW TECHNOLOGIES CO., LTD., George Town (KY)

( * ) Notice: Subject to any disclaimer, the term of this patent is extended or adjusted under 35 U.S.C. 154(b) by 245 days.

(21) Appl. No.: 16/455,511

(22) Filed: Jun. 27, 2019

(65) Prior Publication Data
US 2020/0007514 A1  Jan. 2, 2020

(30) Foreign Application Priority Data
Jun. 29, 2018  (CN) .......................... 201810715210.7

(51) Int. Cl.
*H04L 29/06* (2006.01)
*H04L 9/40* (2022.01)
(Continued)

(52) U.S. Cl.
CPC ........ *H04L 63/0428* (2013.01); *G06F 21/602* (2013.01); *G06F 21/6245* (2013.01);
(Continued)

(58) Field of Classification Search
CPC ... H04L 63/0428; H04L 9/008; H04L 9/0618; H04L 9/085; G06F 21/602; G06F 21/6245

See application file for complete search history.

(56) References Cited

U.S. PATENT DOCUMENTS

| 8,515,058 B1 | 8/2013 | Gentry |
| 8,630,422 B2 | 1/2014 | Gentry |

(Continued)

FOREIGN PATENT DOCUMENTS

| CN | 101034495 A | 9/2007 |
| CN | 104967693 A | 10/2015 |

(Continued)

OTHER PUBLICATIONS

Search Report for Taiwanese Application No. 108110467 dated Jan. 31, 2020.

(Continued)

*Primary Examiner* — Joseph P Hirl
*Assistant Examiner* — Leynna Truvan

(57) ABSTRACT

Privacy protection methods, systems, and apparatus, including computer programs encoded on computer storage media, are provided. One of the methods is performed by a first computing device and includes: obtaining a plurality of object IDs, wherein the plurality of object IDs include a target object ID; sending the plurality of object IDs to a second computing device storing a plurality of pieces of data respectively associated with the plurality of object IDs for the second computing device to generate a plurality of ciphertexts respectively based on the plurality of pieces of data; and executing a cryptography protocol with the second computing device to obtain a ciphertext corresponding to the target object ID from the plurality of ciphertexts generated by the second computing device, wherein the target object ID is unknown to the second computing device.

20 Claims, 8 Drawing Sheets

(51) Int. Cl.
  *G06F 21/60* (2013.01)
  *G06F 21/62* (2013.01)
  *H04L 9/00* (2022.01)
  *H04L 9/06* (2006.01)
  *H04L 9/08* (2006.01)

(52) U.S. Cl.
  CPC ............ *H04L 9/008* (2013.01); *H04L 9/0618* (2013.01); *H04L 9/085* (2013.01)

(56) References Cited

U.S. PATENT DOCUMENTS

| | | | |
|---|---|---|---|
| 8,683,204 | B2 | 3/2014 | Kolesnikov |
| 9,055,038 | B1 | 6/2015 | Lu et al. |
| 9,906,511 | B1 | 2/2018 | Kolman et al. |
| 9,917,820 | B1 | 3/2018 | Kolman et al. |
| 10,061,932 | B1* | 8/2018 | Combs ................. G06F 3/1222 |
| 10,360,390 | B2 | 7/2019 | Tueno et al. |
| 2011/0216902 | A1 | 9/2011 | Kolesnikov |
| 2012/0072992 | A1 | 3/2012 | Arasaratnam et al. |
| 2014/0304277 | A1* | 10/2014 | Veugen .................. G06F 16/40 707/748 |
| 2017/0277906 | A1* | 9/2017 | Camenisch ......... G06F 21/6227 |
| 2017/0359321 | A1 | 12/2017 | Rindal et al. |
| 2018/0019868 | A1 | 1/2018 | Pe'er et al. |
| 2018/0019997 | A1 | 1/2018 | Chabanne et al. |
| 2018/0196927 | A1 | 7/2018 | Pitel |
| 2018/0204284 | A1 | 7/2018 | Cerezo Sanchez |
| 2018/0240100 | A1 | 8/2018 | Leleu |
| 2019/0007196 | A1 | 1/2019 | Malluhi et al. |

FOREIGN PATENT DOCUMENTS

| | | |
|---|---|---|
| CN | 105592102 A | 5/2016 |
| WO | 2017/017501 A1 | 2/2017 |
| WO | 2017218268 A1 | 12/2017 |
| WO | 2018174873 A1 | 9/2018 |
| WO | 2019045741 A1 | 3/2019 |

OTHER PUBLICATIONS

Danny Harnik, et al., "How Many Oblivious Transfers Are Needed for Secure Multiparty Computation?", Department of Computer Science, Technion, Haifa, Israel, 2007.
Yuval Ishai, et al., "Founding Cryptography on Oblivious Transfer—Efficiently", Technion, Israel and University of California, Los Angeles, Oct. 5, 2010.
First Search for Chinese Application No. 201810715210.7 dated May 25, 2020.
Written Opinion of the International Searching Authority and International Search Report for PCT Application No. PCT/US2019/039609 dated Aug. 16, 2019 (15 pages).
Chang et al., "Robust t-out-of-n oblivious transfer mechanism based on CRT," Journal of Network and Computer Applications, Academic Press, New York, vol. 32, No. 1, Jan. 1, 2009, pp. 226-235 (10 pages).
De Cristofaro et al., "Privacy-Preserving Policy-Based Information Transfer," Privacy Enhancing Technologies, Springer Berlin Heidelberg, Aug. 5, 2009, pp. 164-184 (22 pages).
Franz et al., "Oblivious Outsourced Storage with Delegation," International Conference on Computer Analysis of Images and Patterns, CAIP 2017: Computer Analysis of Images and Patterns, Feb. 28, 2011 (14 pages).

\* cited by examiner

METHOD AND APPARATUS FOR OBTAINING INPUT OF SECURE MULTIPARTY COMPUTATION PROTOCOL

CROSS REFERENCE TO RELATED APPLICATION

The present application claims priority to Chinese Patent Application No. 201810715210.7 filed on Jun. 29, 2018, the entire content of which is incorporated herein by reference in the entirety.

TECHNICAL FIELD

Embodiments of the present specification relate to the technical field of cryptography, and particularly to methods and apparatuses for privacy protection.

BACKGROUND

When a service provider (such as a credit evaluation institution, a loan lending institution, or an insurance company) provides a service for an object (an individual, an enterprise, or an organization), it generally evaluates the object (such as the credit and preference of the object) first. When an individual or an enterprise carries out business (such as business cooperation) with an object, it also needs to evaluate this object (such as the credit and assets of the object). The evaluation requires reliable data of the object, but the data of the object is scattered among various data sources (such as banks, tax bureaus, and housing administrations). In order to protect the privacy of the object and the privacy used in evaluation methods, a secure multiparty computation protocol will be executed between an evaluator and one or more data sources, so that the evaluator obtains an evaluation result. A rough flow of an existing technical solution is as follows: an evaluator party provides an ID of an evaluatee object to each of the data sources; after the ID of the evaluatee object is obtained, each data source uses the data of the evaluatee object to execute a secure multiparty computation protocol together with the evaluator party. The execution result of the protocol enables the evaluator to obtain an evaluation result. Further, the object's data of each data source will not leak during the execution of the protocol. In a process of secure multiparty computation (typically at an initial stage), each data source needs to send one or more of: a homomorphic encryption ciphertext, a secret sharing ciphertext, and a salt value of a garbled circuit generated according to data of the evaluatee object to one or more of other parties. However, in the foregoing existing technical solution, the exposure of the ID of the evaluatee object poses a risk of leaking the privacy of the evaluatee object. Therefore, a more effective solution for obtaining an input of a secure multiparty computation protocol is needed.

SUMMARY

Embodiments of the present specification are intended to provide a more effective solution for obtaining an input of a secure multiparty computation protocol to overcome the deficiencies of current technologies. Various systems, methods, devices, and apparatuses for privacy protection may include systems, methods, devices, and apparatuses for obtaining an input of a secure multiparty computation protocol described herein.

In some embodiments, a method for obtaining an input of a secure multiparty computation protocol is provided, and participating parties of the secure multiparty computation protocol include a first server and a second server. The method is executed on the first server and includes: obtaining a plurality of object IDs, wherein the plurality of object IDs include a target object ID associated with the first server, and a plurality of pieces of data respectively associated with the plurality of object IDs are stored in the second server; sending the plurality of object IDs to the second server; and executing an Oblivious Transfer protocol or a Private Information Retrieval protocol with the second server to obtain a ciphertext corresponding to the target object ID from a plurality of ciphertexts generated by the second server, as a local input to the secure multiparty computation protocol, and conceal the target object ID from the second server, wherein the plurality of ciphertexts include a plurality of ciphertexts respectively associated with the plurality of object IDs and generated by the second server by using the plurality of pieces of data.

In some embodiments, a method for obtaining an input of a secure multiparty computation protocol is provided, and participating parties of the secure multiparty computation protocol include a first server, a second server, and a third server. The method is executed on the first server and includes: obtaining a plurality of object IDs, wherein the plurality of object IDs include a target object ID associated with the first server, and a plurality of pieces of data respectively associated with the plurality of object IDs are stored in the second server; sending the plurality of object IDs to the second server; executing an Oblivious Transfer protocol or a Private Information Retrieval protocol with the second server to obtain a ciphertext corresponding to the target object ID from a plurality of ciphertexts generated by the second server and conceal the target object ID from the second server, wherein the plurality of ciphertexts include a plurality of ciphertexts respectively associated with the plurality of object IDs and generated by the second server by using the plurality of pieces of data; and sending the ciphertext corresponding to the target object ID to the third server.

In one embodiment, in the method for obtaining an input of a secure multiparty computation protocol, the plurality of ciphertexts are one of the following types of ciphertexts: a homomorphic encryption ciphertext, a secret sharing ciphertext, and a ciphertext of a salt value of a garbled circuit.

In one embodiment, in the method for obtaining an input of a secure multiparty computation protocol, the ciphertext corresponding to the target object ID is a ciphertext obtained from re-encryption of an initial ciphertext with a first key of the third server, and the initial ciphertext is a ciphertext obtained from one of the following encryptions of data corresponding to the target ID: homomorphic encryption, a secret sharing method, and a garbled circuit method.

In some embodiments, a method for obtaining an input of a secure multiparty computation protocol is provided, and participating parties of the secure multiparty computation protocol include a first server and a second server. The method is executed on the first server and includes: obtaining a plurality of object IDs, wherein the plurality of object IDs include a target object ID associated with the first server, and a plurality of pieces of data respectively associated with the plurality of object IDs are stored in the second server; sending the plurality of object IDs to the second server; receiving a plurality of ciphertexts from the second server and learning about object IDs to which the plurality of ciphertexts respectively correspond, wherein the plurality of ciphertexts include a plurality of ciphertexts respectively associated with the plurality of object IDs and generated by the second server based on a homomorphic encryption method by using the plurality of pieces of data; and obtaining a ciphertext corresponding to the target object ID from the plurality of ciphertexts based on object IDs to which the plurality of ciphertexts respectively correspond, as a local input to the secure multiparty computation protocol.

In some embodiments, a method for obtaining an input of a secure multiparty computation protocol is provided, and participating parties of the secure multiparty computation protocol include a first server, a second server, and a third server. The method is executed on the first server and includes: obtaining a plurality of object IDs, wherein the plurality of object IDs include a target object ID associated with the first server, and a plurality of pieces of data respectively associated with the plurality of object IDs are stored in the second server; sending the plurality of object IDs to the second server; receiving a plurality of ciphertexts from the second server and learning about object IDs to which the plurality of ciphertexts respectively correspond, wherein the plurality of ciphertexts include a plurality of ciphertexts respectively associated with the plurality of object IDs and generated by the second server based on a homomorphic encryption method by using the plurality of pieces of data; obtaining a ciphertext corresponding to the target object ID from the plurality of ciphertexts based on object IDs to which the plurality of ciphertexts respectively correspond; and sending the ciphertext corresponding to the target object ID to the third server, as an input to the secure multiparty computation protocol on the third server.

In one embodiment, in the method for obtaining an input of a secure multiparty computation protocol, receiving a plurality of ciphertexts from the second server and learning about object IDs to which the plurality of ciphertexts respectively correspond includes receiving, from the second server, a plurality of ciphertexts and object IDs to which the plurality of ciphertexts respectively correspond.

In one embodiment, in the method for obtaining an input of a secure multiparty computation protocol, receiving a plurality of ciphertexts from the second server and learning about object IDs to which the plurality of ciphertexts respectively correspond includes receiving, from the second server, a plurality of ciphertexts arranged in sequence and learning about, based on the plurality of ciphertexts arranged in sequence, object IDs to which the plurality of ciphertexts respectively correspond.

In some embodiments, a method for obtaining an input of a secure multiparty computation protocol is provided, and participating parties of the secure multiparty computation protocol include a first server and a second server. The method is executed on the second server and includes: receiving a plurality of object IDs from the first server, wherein the plurality of object IDs include a target object ID associated with the first server; using a plurality of pieces of locally stored data respectively associated with the plurality of object IDs to generate a plurality of ciphertexts respectively associated with the plurality of object IDs; and executing an Oblivious Transfer protocol or a Private Information Retrieval protocol with the first server, so that the first server obtains a ciphertext corresponding to the target object ID from the plurality of ciphertexts and the target object ID is concealed from the second server.

In some embodiments, a method for obtaining an input of a secure multiparty computation protocol is provided, and participating parties of the secure multiparty computation protocol include a first server and a second server. The method is executed on the second server and includes: receiving a plurality of object IDs from the first server, wherein the plurality of object IDs include a target object ID associated with the first server; using a plurality of pieces of locally stored data respectively associated with the plurality of object IDs to generate a plurality of ciphertexts respectively associated with the plurality of object IDs by a homomorphic encryption method; and sending the plurality of ciphertexts to the first server, so that the first server learns about object IDs to which the plurality of ciphertexts respectively correspond.

In some embodiments, a method for obtaining an input of a secure multiparty computation protocol is provided, and participating parties of the secure multiparty computation protocol include a first server, a second server, and a third server. The method is executed on the third server and includes: receiving, from the first server, a ciphertext corresponding to the target object ID, which is obtained by the foregoing method, as a local input to the secure multiparty computation protocol.

In some embodiments, a method for obtaining an input of a secure multiparty computation protocol is provided, and participating parties of the secure multiparty computation protocol include a first server, a second server, and a third server. The method is executed on the third server and includes: receiving, from the first server, a ciphertext corresponding to the target object ID, which is obtained by the foregoing method; and using a local second key to decrypt the ciphertext corresponding to the target object ID to obtain the initial ciphertext, as a local input to the secure multiparty computation protocol.

In some embodiments, an apparatus for obtaining an input of a secure multiparty computation protocol is provided, and participating parties of the secure multiparty computation protocol include a first server and a second server. The apparatus is implemented on the first server and includes: an acquisition unit configured to obtain a plurality of object IDs, wherein the plurality of object IDs include a target object ID associated with the first server, and a plurality of pieces of data respectively associated with the plurality of object IDs are stored in the second server; a sending unit configured to send the plurality of object IDs to the second server; and an execution unit configured to execute an Oblivious Transfer protocol or a Private Information Retrieval protocol with the second server to obtain a ciphertext corresponding to the target object ID from a plurality of ciphertexts generated by the second server, as a local input to the secure multiparty computation protocol, and conceal the target object ID from the second server, wherein the plurality of ciphertexts include a plurality of ciphertexts respectively associated with the plurality of object IDs and generated by the second server by using the plurality of pieces of data.

In some embodiments, an apparatus for obtaining an input of a secure multiparty computation protocol is provided, and participating parties of the secure multiparty computation protocol include a first server, a second server, and a third server. The apparatus is implemented on the first server and includes: an acquisition unit configured to obtain a plurality of object IDs, wherein the plurality of object IDs include a target object ID associated with the first server, and a plurality of pieces of data respectively associated with the plurality of object IDs are stored in the second server; a first sending unit configured to send the plurality of object IDs to the second server; an execution unit configured to execute an Oblivious Transfer protocol or a Private Information Retrieval protocol with the second server to obtain a ciphertext corresponding to the target object ID from a plurality of ciphertexts generated by the second server and conceal the target object ID from the second server, wherein the plurality of ciphertexts include a plurality of ciphertexts respectively associated with the plurality of object IDs and generated by the second server by using the plurality of pieces of data; and a second sending unit configured to send the ciphertext corresponding to the target object ID to the third server.

In some embodiments, an apparatus for obtaining an input of a secure multiparty computation protocol, and participating parties of the secure multiparty computation protocol include a first server and a second server. The apparatus is implemented on the first server and includes: a first acquisition unit configured to obtain a plurality of object IDs, wherein the plurality of object IDs include a target object ID associated with the first server, and a plurality of pieces of data respectively associated with the plurality of object IDs are stored in the second server; a sending unit configured to send the plurality of object IDs to the second server; a receiving unit configured to receive a plurality of ciphertexts from the second server and learn about object IDs to which the plurality of ciphertexts respectively correspond, wherein the plurality of ciphertexts include a plurality of ciphertexts respectively associated with the plurality of object IDs and generated by the second server based on a homomorphic encryption method by using the plurality of pieces of data; and a second acquisition unit configured to obtain a ciphertext corresponding to the target object ID from the plurality of ciphertexts based on object IDs to which the plurality of ciphertexts respectively correspond, as a local input to the secure multiparty computation protocol.

In some embodiments, an apparatus for obtaining an input of a secure multiparty computation protocol is provided, and participating parties of the secure multiparty computation protocol include a first server, a second server, and a third server. The apparatus is implemented on the first server and includes: a first acquisition unit configured to obtain a plurality of object IDs, wherein the plurality of object IDs include a target object ID associated with the first server, and a plurality of pieces of data respectively associated with the plurality of object IDs are stored in the second server; a first sending unit configured to send the plurality of object IDs to the second server; a receiving unit configured to receive a plurality of ciphertexts from the second server and learn about object IDs to which the plurality of ciphertexts respectively correspond, wherein the plurality of ciphertexts include a plurality of ciphertexts respectively associated with the plurality of object IDs and generated by the second server based on a homomorphic encryption method by using the plurality of pieces of data; a second acquisition unit configured to obtain a ciphertext corresponding to the target object ID from the plurality of ciphertexts based on object IDs to which the plurality of ciphertexts respectively correspond; and a second sending unit configured to send the ciphertext corresponding to the target object ID to the third server, as an input to the secure multiparty computation protocol on the third server.

In some embodiments, an apparatus for obtaining an input of a secure multiparty computation protocol is provided, and participating parties of the secure multiparty computation protocol include a first server and a second server. The apparatus is implemented on the second server and includes: a receiving unit configured to receive a plurality of object IDs from the first server, wherein the plurality of object IDs include a target object ID associated with the first server; a generation unit configured to use a plurality of pieces of locally stored data respectively associated with the plurality of object IDs to generate a plurality of ciphertexts respectively associated with the plurality of object IDs; and an execution unit configured to execute an Oblivious Transfer protocol or a Private Information Retrieval protocol with the first server, so that the first server obtains a ciphertext corresponding to the target object ID from the plurality of ciphertexts and the target object ID is concealed from the second server.

In some embodiments, an apparatus for obtaining an input of a secure multiparty computation protocol is provided, and participating parties of the secure multiparty computation protocol include a first server and a second server. The apparatus is implemented on the second server and includes: a receiving unit configured to receive a plurality of object IDs from the first server, wherein the plurality of object IDs include a target object ID associated with the first server; a generation unit configured to use a plurality of pieces of locally stored data respectively associated with the plurality of object IDs to generate a plurality of ciphertexts respectively associated with the plurality of object IDs by a homomorphic encryption method; and a sending unit configured to send the plurality of ciphertexts to the first server, so that the first server learns about object IDs to which the plurality of ciphertexts respectively correspond.

In some embodiments, an apparatus for obtaining an input of a secure multiparty computation protocol is provided, and participating parties of the secure multiparty computation protocol include a first server, a second server, and a third server. The apparatus is implemented on the third server and includes: a receiving unit configured to receive, from the first server, a ciphertext corresponding to the target object ID, which is obtained by the foregoing method for obtaining an input of a secure multiparty computation protocol, as a local input to the secure multiparty computation protocol.

In some embodiments, an apparatus for obtaining an input of a secure multiparty computation protocol is provided, and participating parties of the secure multiparty computation protocol include a first server, a second server, and a third server. The apparatus is implemented on the third server and includes: a receiving unit configured to receive, from the first server, a ciphertext corresponding to the target object ID, which is obtained by the foregoing method for obtaining an input of a secure multiparty computation protocol; and a decryption unit configured to use a local second key to decrypt the ciphertext corresponding to the target object ID to obtain the initial ciphertext, as a local input to the secure multiparty computation protocol.

In some embodiments, a computing device is provided, the computing device including a memory and a processor, characterized in that executable code is stored in the memory and when the processor executes the executable code, any of the foregoing methods is achieved.

In some embodiments, a method for privacy protection is performed by a first computing device and comprises: obtaining a plurality of object IDs, wherein the plurality of object IDs include a target object ID; sending the plurality of object IDs to a second computing device storing a plurality of pieces of data respectively associated with the plurality of object IDs for the second computing device to generate a plurality of ciphertexts respectively based on the plurality of pieces of data; and executing a cryptography protocol with the second computing device to obtain a ciphertext corresponding to the target object ID from the plurality of ciphertexts generated by the second computing device, wherein the target object ID is unknown to the second computing device.

In one embodiment, the cryptography protocol comprises an Oblivious Transfer protocol. In another embodiment, the cryptography protocol comprises a Private Information Retrieval protocol.

In some embodiments, the plurality of ciphertexts comprise one of the following types of ciphertexts: a homomorphic encryption ciphertext, a secret sharing ciphertext, and a ciphertext of a salt value of a garbled circuit.

In some embodiments, executing the cryptography protocol comprises executing the cryptography protocol for one or more times.

In some embodiments, the method further comprises: inputting the obtained ciphertext corresponding to the target object ID to a secure multiparty computation protocol, wherein participating parties of the secure multiparty computation protocol comprise the first computing device and the second computing device.

In some embodiments, the method further comprises: sending the ciphertext corresponding to the target object ID to a third computing device as an input to a secure multiparty computation protocol, wherein participating parties of the secure multiparty computation protocol comprise the first computing device, the second computing device, and the third computing device.

In some embodiments, the method further comprises: sending the ciphertext corresponding to the target object ID to a third computing device for the third computing device to decrypt the ciphertext corresponding to the target object ID to obtain an initial ciphertext as an input to a secure multiparty computation protocol, wherein participating parties of the secure multiparty computation protocol comprise the first computing device, the second computing device, and the third computing device.

In some embodiments, the ciphertext corresponding to the target object ID is encrypted by the second computing device based on the initial ciphertext with a first key of the third computing device; and sending the ciphertext corresponding to the target object ID to the third computing device for the third computing device to decrypt the ciphertext corresponding to the target object ID comprises: sending the ciphertext corresponding to the target object ID to the third computing device for the third computing device to decrypt the ciphertext corresponding to the target object ID with a second key.

In some embodiments, the method further comprises: the initial ciphertext is encrypted based on the target ID by one of the following encryption methods: a homomorphic encryption method, a secret sharing method, and a garbled circuit method.

In some embodiments, a method for privacy protection is performed by a second computing device and comprises: receiving a plurality of object IDs from a first computing device, wherein the plurality of object IDs include a target object ID; encrypting a plurality of pieces of data respectively associated with the plurality of object IDs to generate a plurality of ciphertexts respectively associated with the plurality of object IDs; and executing a cryptography protocol with the first computing device for the first computing device to obtain a ciphertext corresponding to the target object ID from the plurality of ciphertexts, wherein the target object ID is unknown to the second computing device.

In one embodiment, the cryptography protocol comprises an Oblivious Transfer protocol. In another embodiment, the cryptography protocol comprises a Private Information Retrieval protocol.

In some embodiments, the plurality of ciphertexts comprise one of the following types of ciphertexts: a homomorphic encryption ciphertext, a secret sharing ciphertext, and a ciphertext of a salt value of a garbled circuit.

In some embodiments, a system for privacy protection comprises one or more processors and one or more computer-readable memories coupled to the one or more processors and having instructions stored thereon that are executable by the one or more processors to perform the method of any of the preceding embodiments.

In some embodiments, an apparatus for privacy protection comprises a plurality of modules for performing the method of any of the preceding embodiments.

In some embodiments, a non-transitory computer-readable medium having stored therein instructions that, when executed by a processor of a device, cause the device to perform the method of any of the preceding embodiments.

In some embodiments, a system for privacy protection acting as a first computing device comprises one or more processors and one or more non-transitory computer-readable memories coupled to the one or more processors and configured with instructions executable by the one or more processors to cause the system to perform operations comprising: obtaining a plurality of object ids, wherein the plurality of object ids include a target object id; sending the plurality of object ids to a second computing device storing a plurality of pieces of data respectively associated with the plurality of object ids for the second computing device to generate a plurality of ciphertexts respectively based on the plurality of pieces of data; and executing a cryptography protocol with the second computing device to obtain a ciphertext corresponding to the target object id from the plurality of ciphertexts generated by the second computing device, wherein the target object id is unknown to the second computing device.

In some embodiments, a non-transitory computer-readable storage medium for privacy protection is configured with instructions executable by one or more processors to cause the one or more processors to perform operations comprising: obtaining a plurality of object ids, wherein the plurality of object ids include a target object id; sending the plurality of object ids to a second computing device storing a plurality of pieces of data respectively associated with the plurality of object ids for the second computing device to generate a plurality of ciphertexts respectively based on the plurality of pieces of data; and executing a cryptography protocol with the second computing device to obtain a ciphertext corresponding to the target object id from the plurality of ciphertexts generated by the second computing device, wherein the target object id is unknown to the second computing device.

In some embodiments, a system for privacy protection acting as a second computing device comprises one or more processors and one or more non-transitory computer-readable memories coupled to the one or more processors and configured with instructions executable by the one or more processors to cause the system to perform operations comprising: receiving a plurality of object IDs from a first computing device, wherein the plurality of object IDs include a target object ID; encrypting a plurality of pieces of data respectively associated with the plurality of object IDs to generate a plurality of ciphertexts respectively associated with the plurality of object IDs; and executing a cryptography protocol with the first computing device for the first computing device to obtain a ciphertext corresponding to the target object ID from the plurality of ciphertexts, wherein the target object ID is unknown to the second computing device.

In some embodiments, a non-transitory computer-readable storage medium for privacy protection is configured with instructions executable by one or more processors to cause the one or more processors to perform operations comprising: receiving a plurality of object IDs from a first computing device, wherein the plurality of object IDs include a target object ID; encrypting a plurality of pieces of data respectively associated with the plurality of object IDs to generate a plurality of ciphertexts respectively associated with the plurality of object IDs; and executing a cryptography protocol with the first computing device for the first computing device to obtain a ciphertext corresponding to the target object ID from the plurality of ciphertexts, wherein the target object ID is unknown to the second computing device.

Through a solution for secure multiparty computation provided in one embodiment of the present specification, the privacy of a target object is further protected, and security of secure multiparty computation is improved.

BRIEF DESCRIPTION OF THE DRAWING

Embodiments of the present specification will be described with reference to the accompanying drawings from which the embodiments of the present specification will be more apparent.

DETAILED DESCRIPTION

The embodiments of the present specification will be described below with reference to the accompanying drawings.

Figure 1:
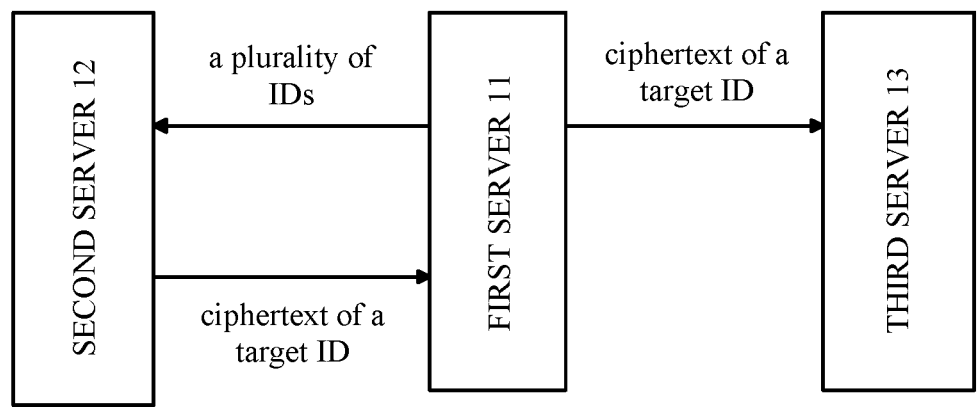
FIG. 1 is a schematic diagram of secure multiparty computation according to an embodiment of the present specification.

FIG. 1 is a schematic diagram of secure multiparty computation according to an embodiment of the present specification. As shown in FIG. 1, the secure multiparty computation involves three parties: a first server 11, a second server 12, and a third server 13. The first server 11 may be a server of an evaluator party, such as an evaluation institution, a loan lending institution, or an insurance institution. When the evaluator party provides a service for an individual or an enterprise, the evaluator party will typically evaluate the credit, preference, and other features of the individual or enterprise. The second servers 12 and 13 may be servers of data source parties, such as banks, tax bureaus, and housing administrations, and contain historical data of individuals or enterprises.

As shown in FIG. 1, in one embodiment, both parties of the first server 11 and the second server 12 execute a secure multiparty protocol. In this case, the first server 11 sends a plurality of object IDs (a plurality of IDs) to the second server 12. Object IDs in this group include an ID of a target object that the first server 11 will evaluate. The second server 12 uses data included in the second server 12 and respectively associated with the plurality of object IDs to generate a plurality of ciphertexts. Thereby, the first server 11 obtains a ciphertext of a target object ID (target ID) based on the plurality of ciphertexts, while the target ID is concealed from the second server 12.

In one embodiment, after generating a plurality of ciphertexts, a second server 12 and a first server 11 execute an Oblivious Transfer protocol (OT protocol) or a Private Information Retrieval protocol (PIR protocol). An OT protocol is a type of protocol in which a sender transfers one of potentially many pieces of information to a receiver, but remains oblivious as to what piece (if any) has been transferred. A PIR protocol is a protocol that allows a receiver to retrieve a piece of information from a sender in possession of a database without revealing which piece of information is retrieved. Through the execution of the OT protocol or PIR protocol, the first server 11 may obtain a ciphertext corresponding to a target object ID in the plurality of ciphertexts, while the second server 12 cannot obtain the target object ID. In other words, the target object ID is concealed from the second server 12, thereby preventing privacy leakage. After the first server 11 obtains the ciphertext of the target object, the first server 11 may use this ciphertext as an input of a secure multiparty computation protocol.

In one embodiment, a second server 12 generates a plurality of homomorphic encryption ciphertexts corresponding to the plurality of IDs, and sends this group of ciphertexts and respectively corresponding IDs to a first server, thereby the first server obtains a ciphertext corresponding to the target ID according to the IDs.

In another embodiment, a first server 11, a second server 12, and a third server 13 participate in secure multiparty computation. In this case, the first server 11 sends a plurality of object IDs (a plurality of IDs) to the second server. The plurality of IDs include an ID of a target object that the first server 11 will evaluate (target ID). Then, the first server 11 and the second server 12 execute an OT protocol (or a PIR protocol) to obtain a ciphertext of the target object from the second server 12 and send the ciphertext of the target object to the third server 13, as an input of a secure multiparty computation protocol on the third server 13. Likewise, in this process, the target object ID is concealed from both the second server 12 and the third server 13.

The three parties for computation shown in FIG. 1 are schematic. In this embodiment, secure multiparty computation may include two or more parties participating in the computation. In some embodiments, the first server is not limited to be a server of an evaluator party, and the second server and the third server are not limited to be servers of data source parties. For example, the first server may be a server of the evaluator party and the data source party at the same time. Further, a ciphertext obtained from one time of execution of an OT protocol or a plurality of ciphertexts obtained from multiple times of executions of the OT protocol may be input to the secure multiparty computation protocol. In some embodiments, the multiple times of executions of the OT protocol may be multiple times of executions between the first server 11 and the same data source server, or multiple times of executions between the first server 11 and a plurality of data source servers.

Figure 2:
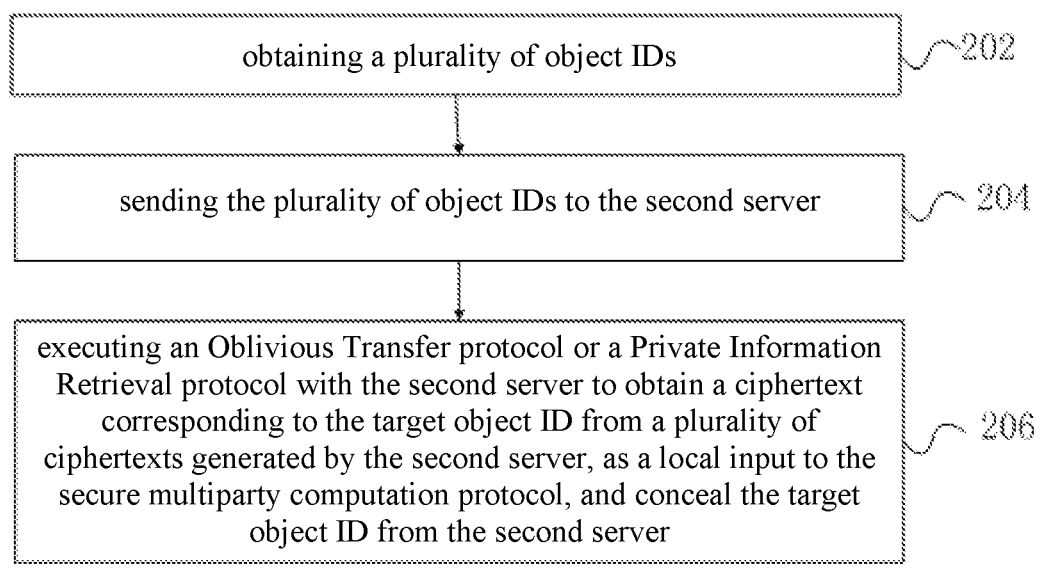
FIG. 2 is a flow chart of a method for obtaining an input of a secure multiparty computation protocol according to an embodiment of the present specification.

FIG. 2 is a flow chart of a method for obtaining an input of a secure multiparty computation protocol according to an embodiment of the present specification. Participating parties of the secure multiparty computation include a first server and a second server. The method is executed on the first server and includes the following steps:

Step S202, obtaining a plurality of object IDs, wherein the plurality of object IDs include a target object ID associated with the first server, and a plurality of pieces of data respectively associated with the plurality of object IDs are stored in the second server;

Step S204, sending the plurality of object IDs to the second server; and

Step S206, executing an Oblivious Transfer protocol or a Private Information Retrieval protocol with the second server to obtain a ciphertext corresponding to the target object ID from a plurality of ciphertexts generated by the second server, as a local input to the secure multiparty computation protocol, and conceal the target object ID from the second server, wherein the plurality of ciphertexts include a plurality of ciphertexts respectively associated with the plurality of object IDs and generated by the second server by using the plurality of pieces of data.

In some embodiments, a method for privacy protection is performed by a first computing device (e.g., first server) and comprises: obtaining a plurality of object IDs, wherein the plurality of object IDs include a target object ID; sending the plurality of object IDs to a second computing device (e.g., second server) storing a plurality of pieces of data respectively associated with the plurality of object IDs for the second computing device to generate a plurality of ciphertexts respectively based on the plurality of pieces of data; and executing a cryptography protocol with the second computing device to obtain a ciphertext corresponding to the target object ID from the plurality of ciphertexts generated by the second computing device, wherein the target object ID is unknown to the second computing device. That is, the second computing device may not know which of the plurality of object IDs is the target object ID. In one embodiment, the cryptography protocol comprises an Oblivious Transfer protocol. In another embodiment, the cryptography protocol comprises a Private Information Retrieval protocol. In some embodiments, the plurality of ciphertexts comprise one of the following types of ciphertexts: a homomorphic encryption ciphertext, a secret sharing ciphertext, and a ciphertext of a salt value of a garbled circuit. In some embodiments, executing the cryptography protocol comprises executing the cryptography protocol for one or more times.

In some embodiments, the method for privacy protection further comprises: inputting the obtained ciphertext corresponding to the target object ID to a secure multiparty computation protocol, wherein participating parties of the secure multiparty computation protocol comprise the first computing device and the second computing device.

In some embodiments, the method for privacy protection further comprises: sending the ciphertext corresponding to the target object ID to a third computing device as an input to a secure multiparty computation protocol, wherein participating parties of the secure multiparty computation protocol comprise the first computing device, the second computing device, and the third computing device.

In some embodiments, the method the method for privacy protection further comprises: sending the ciphertext corresponding to the target object ID to a third computing device for the third computing device to decrypt the ciphertext corresponding to the target object ID to obtain an initial ciphertext as an input to a secure multiparty computation protocol, wherein participating parties of the secure multiparty computation protocol comprise the first computing device, the second computing device, and the third computing device.

In some embodiments, the ciphertext corresponding to the target object ID is encrypted by the second computing device based on the initial ciphertext with a first key of the third computing device; and sending the ciphertext corresponding to the target object ID to the third computing device for the third computing device to decrypt the ciphertext corresponding to the target object ID comprises: sending the ciphertext corresponding to the target object ID to the third computing device for the third computing device to decrypt the ciphertext corresponding to the target object ID with a second key. In some embodiments, the method for privacy protection further comprises: the initial ciphertext is encrypted based on the target ID by one of the following encryption methods: a homomorphic encryption method, a secret sharing method, and a garbled circuit method.

The method shown in FIG. 2 is executed on the first server. In some embodiments, the secure multiparty computation may be, for example, a computation between the first server 11 and the second server 12 as shown in FIG. 1. Nevertheless, the computation between two parties mentioned here is schematic. The secure multiparty computation in this embodiment may include any number of participating parties. For instance, the secure multiparty computation may be a secure computation among three parties of a first server, a second server, and a third server, wherein a secure multiparty computation method shown in FIG. 2 is implemented between the first server and the second server, and a secure multiparty computation method shown in FIG. 2 is similarly implemented between the first server and the third server. The first server is, for example, a server of an evaluator party. The evaluator party is, for example, an evaluation institution, a loan lending institution, or an insurance institution, and when the evaluator party provides a service for an object (such as an individual, an enterprise, or an organization), for example, providing a loan, the evaluator party will generally evaluate this object (such as the credit and preference of the object). The second server is an institution having credible data of an object to be evaluated (i.e., a target object), such as a bank, a tax bureau, or a housing administration.

Firstly, in step S202, a plurality of object IDs are obtained, wherein the plurality of object IDs include a target object ID associated with the first server, and a plurality of pieces of data respectively associated with the plurality of object IDs are stored in the second server. When the target object is an individual, the object ID may be an ID number of the individual, such as an identification card number or a passport number, or may be one of code IDs set by the second server for a plurality of objects including the target object. When the target object is an enterprise or an organization, the object ID may be a name of the enterprise, a business license registration number of the enterprise, or a social credit code of the enterprise, or may be a code ID set by the second server. The plurality of object IDs may be a plurality of IDs with discrete numbers, or may be a plurality of IDs with consecutive numbers.

In some embodiments, no particular limitation is imposed on the number of object IDs in this group. Alternatively, it may be set by the first server according to security requirements. For example, the number of object IDs in this group may be 10, 20, etc. As an example, a first server prepares 10 object IDs including a target object, and sends the object IDs to a second server. After the 10 object IDs are sent, the second server may determine if the data of these 10 IDs is available. If not, 10 other IDs (including a target ID) may be used as replacement until the second server determines that the data of all the 10 IDs is available. Alternatively, the first server may obtain 10 IDs including a target ID provided by the second server, for example, from an ID data sheet.

The plurality of pieces of data are respective characteristic data of the plurality of IDs, such as a deposit amount, a monthly income, an amount of tax payment, a monthly expenditure, or an amount of monthly repayment. The data may be in a form of a single number, or may be in a form of a numerical matrix. The form and content of the data may be designated by the first server when the first server sends the plurality of IDs, or may be agreed between the first server and the second server in advance.

In Step S204, the plurality of object IDs are sent to the second server. The first server sends, for example, 10 IDs including a target ID to the second server, thereby concealing the target ID from the second server among these 10 IDs and avoiding privacy leakage of the target ID. The first server may send a plurality of object IDs in a full list to the second server. When the plurality of object IDs are consecutive numbers, sending the plurality of object IDs to the second server may include sending a lower limit and an upper limit of the plurality of object IDs to the second server.

After the second server receives the foregoing 10 IDs, for example, the second server uses the respective data of the 10 IDs contained therein to prepare ciphertexts corresponding to the 10 IDs respectively. The ciphertexts may, for example, be homomorphic encryption ciphertexts, salt values of a garbled circuit, or secret sharing ciphertexts, but the ciphertexts are not limited to the foregoing three types of ciphertexts, and may be ciphertexts obtained by other encryption methods as long as the ciphertexts can be used in the secure multiparty computation protocol and enable the evaluator party to obtain a final evaluation result. In one embodiment, a data encryption method may be agreed between a first server and a second server in advance, or may be designated by the first server when the first server sends a plurality of IDs to the second server.

In Step S206, an Oblivious Transfer protocol or a Private Information Retrieval protocol is executed on the second server to obtain a ciphertext corresponding to the target object ID from a plurality of ciphertexts generated by the second server, as a local input to the secure multiparty computation protocol, and conceal the target object ID from the second server, wherein the plurality of ciphertexts include a plurality of ciphertexts respectively associated with the plurality of object IDs and generated by the second server by using the plurality of pieces of data. After the second server has prepared respective ciphertexts of 10 IDs, the first server and the second server begin to execute the OT protocol or the PIR protocol. In one embodiment, a first server (i.e., an evaluator party) has an authority of obtaining a data ciphertext of a target object but not data ciphertexts of other IDs. Whereas the first server tends to obtain a data ciphertext of a target ID without disclosing the target ID to the second server. Therefore, the first server and the second server execute, for example, an OT protocol. In some embodiments, the OT protocol may include a plurality of OT protocols, such as an OT protocol based on a computational assumption, an OT protocol based on a quantum theory, an OT protocol based on a noisy channel, and an OT protocol based on a storage-constrained model. Through the execution of an OT protocol on the first server and the second server, the first server can obtain a ciphertext of a target ID from ciphertexts to which the foregoing 10 IDs correspond, while the second server is unable to learn about which ID's ciphertext the first server has obtained. In other words, the target ID is concealed from the second server.

After obtaining the ciphertext of the target ID, the first server uses this ciphertext as a local input to the secure multiparty computation protocol.

In one embodiment, the secure multiparty computation may perform operations on one or more ciphertexts obtained from one or more times of the executions of an OT protocol (or PIR protocol) by a first server and a second server, or may perform operations on the one or more ciphertexts as well as the local data of the first server. The foregoing one or more ciphertexts may be any of a homomorphic encryption ciphertext, a secret sharing ciphertext, and a salt value of a garbled circuit respectively. The first server and the second server may execute an OT protocol for multiple times to obtain ciphertexts of different data of a target ID. For example, a ciphertext of a deposit amount of the target ID is obtained through one execution of the OT protocol, and a ciphertext of a monthly income of the target ID is obtained through another execution of the OT protocol. Ciphertexts obtained from different times of executions of the OT protocol may employ the same encryption form. For example, the ciphertexts may be all homomorphic encryption ciphertexts. Alternatively, ciphertexts obtained from different times of executions of the OT protocol may employ different encryption forms. For example, some of the ciphertexts may be homomorphic encryption ciphertexts, and some of the ciphertexts may be secret sharing ciphertexts. An encryption form of data is determined according to an operation to be performed with the data. For example, for data to be used in matrix operation, a share ciphertext is obtained by a secret sharing method; and for data to be used in comparison operation, a ciphertext is obtained by a garbled circuit method. In the secure multiparty computation, when an operation is to be performed on ciphertexts in different forms, the ciphertexts are converted into the same form to perform unified operations.

In one embodiment, as described above, the method for secure multiparty computation shown in FIG. 2 may include any number of participating parties, for example, may also include a third server. In this case, the third server may participate in computation, similar to the second server. In other words, the first server and the third server execute an OT protocol (or a PIR protocol) to obtain a ciphertext corresponding to a target ID from the third server. Accordingly, the first server locally inputs the ciphertext obtained from the third server to the secure multiparty computation protocol.

Figure 3:
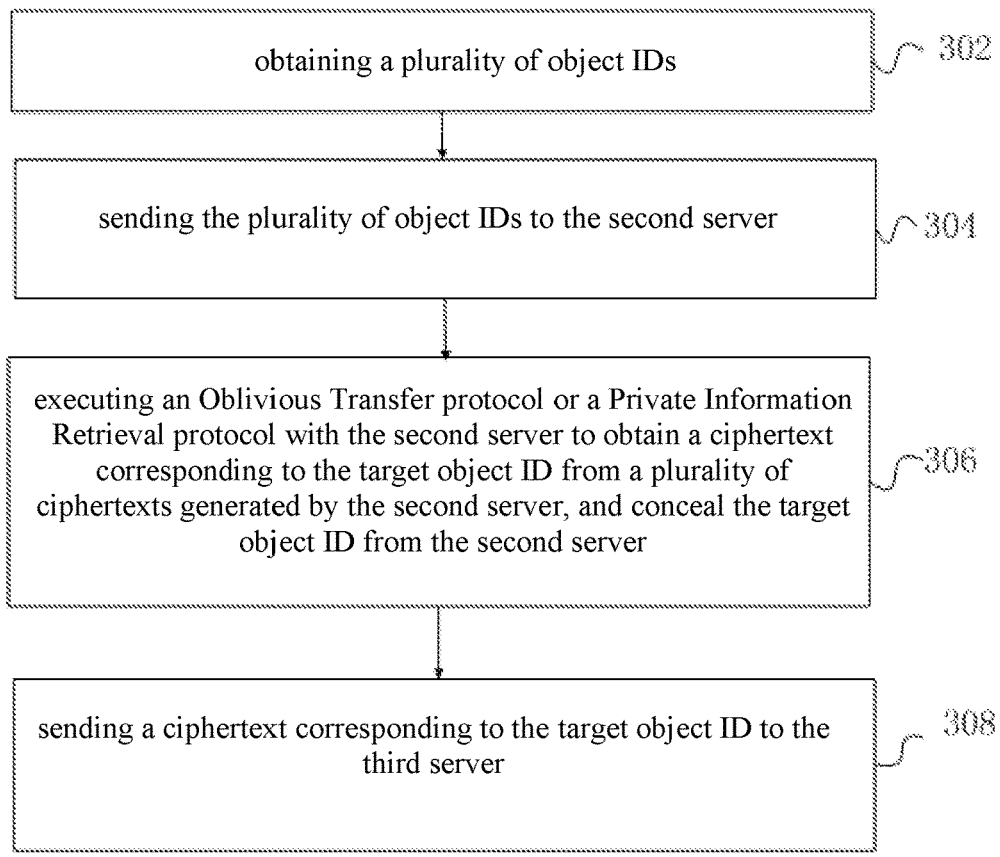
FIG. 3 is a flow chart of a method for obtaining an input of a secure multiparty computation protocol according to another embodiment of the present specification.

FIG. 3 is a flow chart of a method for obtaining an input of a secure multiparty computation protocol according to another embodiment of the present specification. Participating parties of the secure multiparty computation include a first server, a second server, and a third server, and the method is executed on the first server. In some embodiments, the secure multiparty computation may be a computation among the three parties of the first server 11, the second server 12, and the third server 13 as shown in FIG. 1. The first server is, for example, a server of an evaluator party. The evaluator party is, for example, an evaluation institution, a loan lending institution, or an insurance institution; the second server is, for example, a bank server; and the third server is, for example, a server of a tax bureau. The method includes the following steps S302-S308.

In Step S302, a plurality of object IDs are obtained, wherein the plurality of object IDs include a target object ID associated with the first server, and a plurality of pieces of data respectively associated with the plurality of object IDs are stored in the second server. The implementation of this step is substantially consistent with the foregoing description of step S202 in FIG. 2, and the implementation will not be elaborated here.

In Step S304, the plurality of object IDs are sent to the second server. The implementation of this step may refer to the foregoing description of step S204 in FIG. 2, and the implementation will not be elaborated here.

In Step S306, an Oblivious Transfer protocol or a Private Information Retrieval protocol is executed with the second server to obtain a ciphertext corresponding to the target object ID from a plurality of ciphertexts generated by the second server and conceal the target object ID from the second server, wherein the plurality of ciphertexts include a plurality of ciphertexts respectively associated with the plurality of object IDs and generated by the second server by using the plurality of pieces of data.

In one embodiment, similar to the foregoing description of step S206 in FIG. 2, the second server uses the plurality of pieces of data to generate a plurality of ciphertexts respectively associated with the plurality of object IDs. The plurality of ciphertexts are, for example, one of the following types of ciphertexts: a homomorphic encryption ciphertext, a secret sharing ciphertext, and a ciphertext of a salt value of a garbled circuit.

In one embodiment, after the second server uses the plurality of pieces of data to generate a plurality of initial ciphertexts respectively corresponding to the object IDs, the second server further uses a first key of a third server to re-encrypt each of the initial ciphertexts to generate the plurality of ciphertexts. In some embodiments, the plurality of initial ciphertexts are, for example, one of the following types of ciphertexts: a homomorphic encryption ciphertext, a secret sharing ciphertext, and a ciphertext of a salt value of a garbled circuit. The first key is, for example, a symmetric key, or a public key for encryption. The second server, for example, may obtain the first key from the third server via the first server, or may obtain the first key from the third server.

In Step S308, the ciphertext corresponding to the target object ID is sent to the third server.

In one embodiment, the ciphertext is a homomorphic encryption ciphertext, a salt value of a garbled circuit, or a secret sharing ciphertext. The secure multiparty computation on a third server may perform operations on one or more ciphertexts obtained from one or more times of executions of an OT protocol (or a PIR protocol) by a first server and a second server. The foregoing one or more ciphertexts may respectively be any of: a homomorphic encryption ciphertext, a secret sharing ciphertext, and a salt value of a garbled circuit. Ciphertexts obtained from different times of executions of the OT protocol may be the same encryption form. For example, the ciphertexts are all homomorphic encryption ciphertexts. Alternatively, ciphertexts obtained from different times of executions of the OT protocol may be different encryption forms. For example, some of the ciphertexts are homomorphic encryption ciphertexts and some of the ciphertexts are secret sharing ciphertexts.

In one embodiment, as described above, the ciphertext is a ciphertext obtained from re-encryption of an initial ciphertext by a first key of a third server. In this case, after the third server receives the ciphertext from a first server, the third server uses a second key to decrypt the ciphertext to obtain the initial ciphertext, and inputs the initial ciphertext to secure multiparty computation of the third server. In some embodiments, the second key of the third server is, for example, a symmetric key (i.e., same as the first key), or is, for example, used as a private key for decryption.

In the foregoing description of the method shown in FIG. 3, participating parties of the secure multiparty computation include a first server, a second server, and a third server. Nevertheless, this is exemplary. The secure multiparty computation may include any number of participating parties. For example, the secure multiparty computation may further include a fourth server. Similar to the second server, the fourth server may participate in the computation, i.e., through an execution of an OT protocol with the first server, and the fourth server enables the first server to obtain a ciphertext to be transferred to the third server. Consequently, the ciphertext from the fourth server is further inputted to the secure multiparty computation on the third server.

Figure 4:
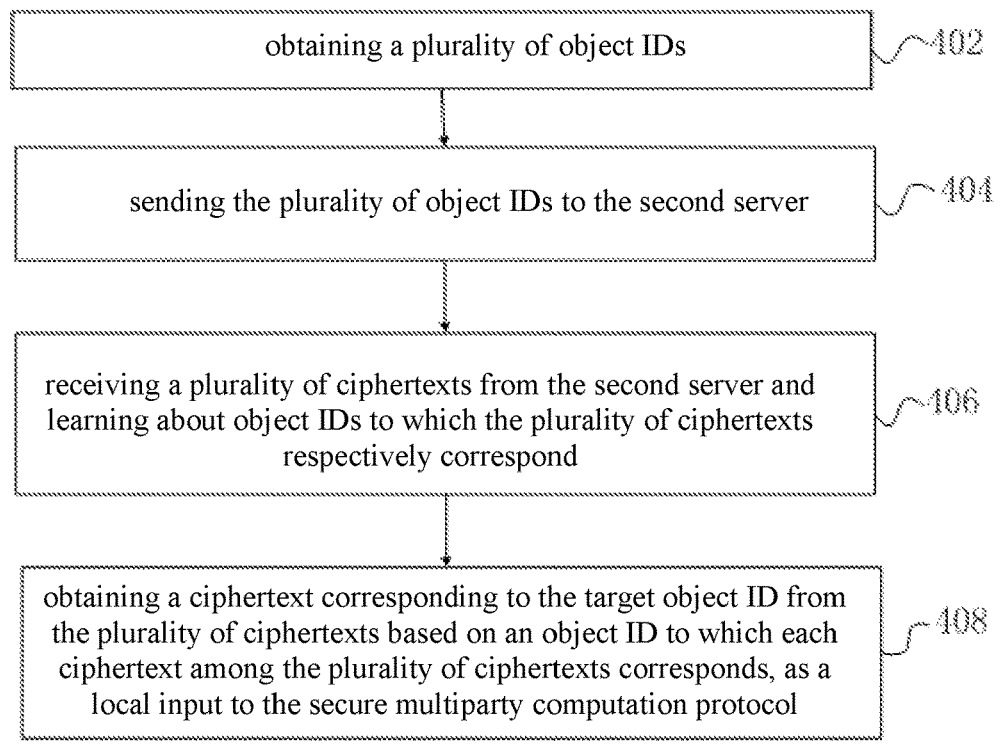
FIG. 4 is a flow chart of a method for obtaining an input of a secure multiparty computation protocol according to another embodiment embodiments of the present specification.

FIG. 4 is a flow chart of a method for obtaining an input of a secure multiparty computation protocol according to another embodiment of the present specification. Participating parties of the secure multiparty computation protocol include a first server and a second server, and the method is executed on the first server and includes the following steps S402-408.

In Step S402, a plurality of object IDs are obtained, wherein the plurality of object IDs include a target object ID associated with the first server, and a plurality of pieces of data respectively associated with the plurality of object IDs are stored in the second server.

In Step S404, the plurality of object IDs are sent to the second server.

The implementation of step S402 and step S404 may refer to the foregoing description of step S202 and step S204 in FIG. 2, and the implementation will not be elaborated here.

In Step S406, a plurality of ciphertexts are received from the second server and respectively corresponding object IDs are learned about, wherein the plurality of ciphertexts include a plurality of ciphertexts respectively associated with the plurality of object IDs and generated by the second server based on a homomorphic encryption method by using the plurality of pieces of data.

In one embodiment, the second server uses the plurality of pieces of data to generate a plurality of ciphertexts associated with the plurality of object IDs by a homomorphic encryption method, i.e., the plurality of ciphertexts are homomorphic encryption ciphertexts. When the second server generates a homomorphic ciphertext of each ID among a plurality of IDs, different random numbers may be used to generate homomorphic ciphertexts for different IDs. Consequently, according to the homomorphic ciphertext of each ID, correlations among real data of IDs cannot be derived reversely. That is, it is safe to send this group of ciphertexts and corresponding IDs to a first server by a second server, and it will not leak the privacy of the IDs.

In one embodiment, a first server receives IDs to which the plurality of ciphertexts respectively correspond to from a second server, thereby a ciphertext corresponding to a target ID may be obtained based on each received ID. In one embodiment, a second server sends the plurality of ciphertexts to a first server in a sequence according to the corresponding ID values. Therefore, the first server may learn about, from the arrangement sequence of the plurality of ciphertexts, the IDs to which the plurality of ciphertexts respectively correspond to.

In Step S408, a ciphertext corresponding to the target object ID is obtained from the plurality of ciphertexts based on an object ID to which each ciphertext among the plurality of ciphertexts corresponds to, as a local input to the secure multiparty computation protocol. After the first server learns about IDs to which a plurality of the foregoing ciphertexts respectively correspond, the first server may find a target ID and a ciphertext to which the target ID corresponds based on the IDs, thereby using the ciphertext corresponding to the target ID as a local input to a secure multiparty protocol.

Similar to the foregoing embodiment shown in FIG. 2, a plurality of homomorphic encryption ciphertexts corresponding to a target ID, which are obtained from multiple times of executions of the method shown in FIG. 4, or a homomorphic encryption ciphertext corresponding to a target ID sent to the first server from another server (such as a third server) may be input into a secure multiparty computation protocol in the embodiment. In some embodiments, similar to the second server, the other server sends a plurality of homomorphic encryption ciphertexts respectively corresponding to a plurality of IDs to the first server, and the IDs include the target ID.

Figure 5:
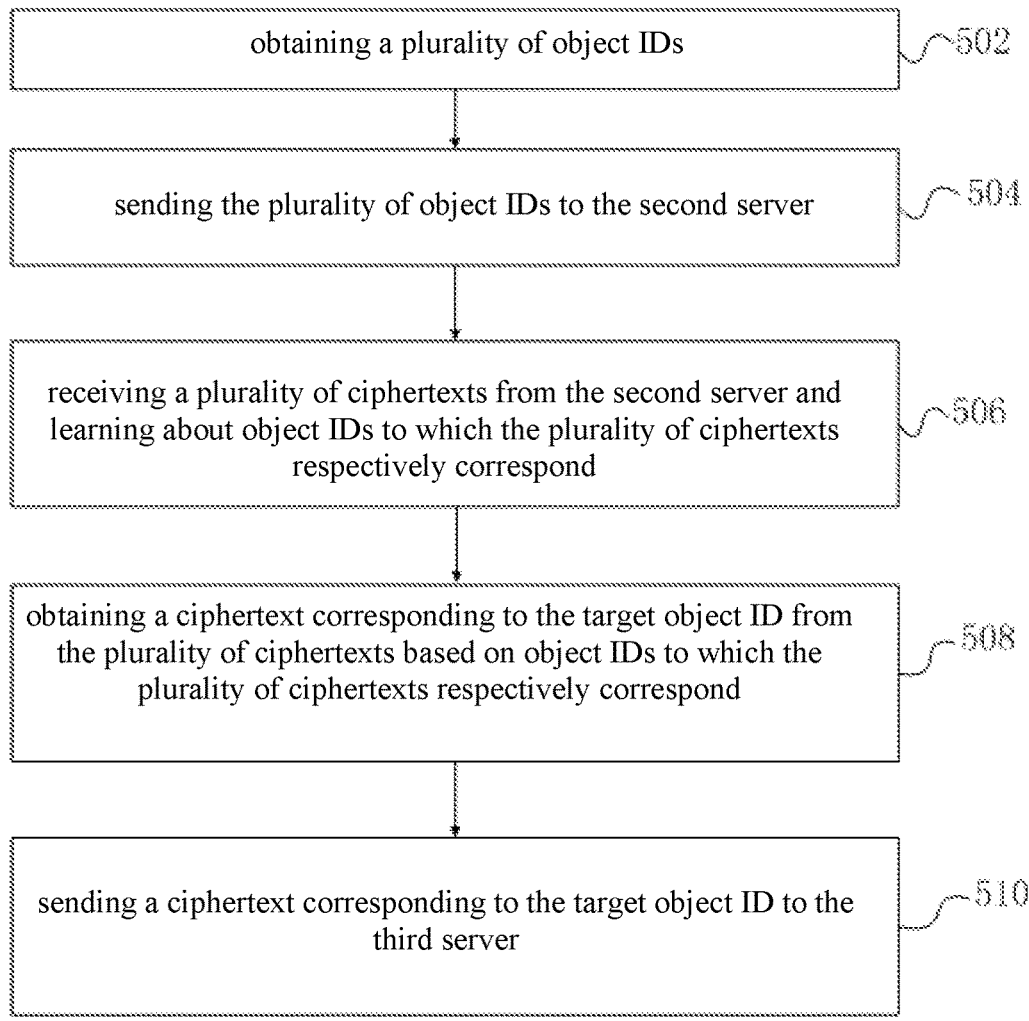
FIG. 5 is a flow chart of a method for obtaining an input of a secure multiparty computation protocol according to another embodiment of the present specification.

FIG. 5 is a flow chart of a method for obtaining an input of a secure multiparty computation protocol according to another embodiment of the present specification. Participating parties of the secure multiparty computation protocol include a first server, a second server, and a third server, and the method is executed on the first server and includes the following steps S502-S510.

In Step S502, a plurality of object IDs are obtained, wherein the plurality of object IDs include a target object ID associated with the first server, and a plurality of pieces of data respectively associated with the plurality of object IDs are stored in the second server.

In Step S504, the plurality of object IDs are sent to the second server.

In Step S506, a plurality of ciphertexts are received from the second server and object IDs to which the plurality of ciphertexts respectively correspond are learned about, wherein the plurality of ciphertexts include a plurality of ciphertexts respectively associated with the plurality of object IDs and generated by the second server based on a homomorphic encryption method by using the plurality of pieces of data.

In some embodiments, a method for privacy protection is performed by a second computing device (e.g., second server) and comprises: receiving a plurality of object IDs from a first computing device (e.g., first server), wherein the plurality of object IDs include a target object ID; encrypting a plurality of pieces of data respectively associated with the plurality of object IDs to generate a plurality of ciphertexts respectively associated with the plurality of object IDs; and executing a cryptography protocol with the first computing device for the first computing device to obtain a ciphertext corresponding to the target object ID from the plurality of ciphertexts, wherein the target object ID is unknown to the second computing device.

The implementation of steps S502-S506 may refer to the foregoing description of steps S402-S406 in FIG. 4, and the implementation will not be elaborated here.

In Step S508, a ciphertext corresponding to the target object ID is obtained from the plurality of ciphertexts based on object IDs to which the plurality of ciphertexts respectively correspond. After the first server learns about IDs to which the plurality of ciphertexts respectively correspond to, the first server may find a target ID and a ciphertext corresponding to the target ID according to the IDs.

In Step S510, a ciphertext corresponding to the target object ID is sent to the third server. In this embodiment, similar to the foregoing embodiment shown in FIG. 3, after the first server obtains a ciphertext corresponding to the target ID, the first server transfers this ciphertext to the third server to input this ciphertext to the secure multiparty computation protocol on the third server.

Similar to the foregoing embodiment shown in FIG. 3, a plurality of homomorphic encryption ciphertexts corresponding to a target ID and obtained from multiple times of executions of the method shown in FIG. 3, or a homomorphic encryption ciphertext corresponding to a target ID and which is sent to the first server from another server (such as a fourth server) and forwarded to the third server via the first server may be input to a secure multiparty computation protocol in this embodiment. In some embodiments, similar to the second server, the other server sends a plurality of homomorphic encryption ciphertexts respectively corresponding to a plurality of IDs to the first server, and the IDs include the target ID.

Figure 6:
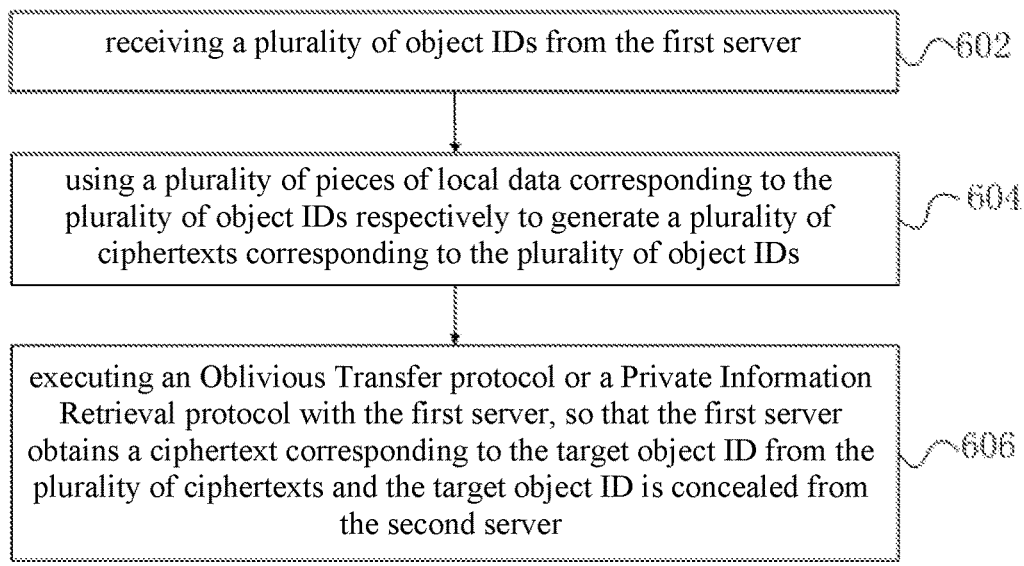
FIG. 6 is a flow chart of a method for obtaining an input of a secure multiparty computation protocol according to another embodiment of the present specification.

FIG. 6 is a flow chart of a method for obtaining an input of a secure multiparty computation protocol according to another embodiment of the present specification. Participating parties of the secure multiparty computation include a first server and a second server, and the method is executed on the second server and includes the following steps S602-S606.

In Step S602, a plurality of object IDs are received from the first server, wherein the plurality of object IDs include a target object ID associated with the first server.

In Step S604, a plurality of pieces of local data respectively associated with the plurality of object IDs are used to generate a plurality of ciphertexts respectively associated with the plurality of object IDs.

In Step S606, an Oblivious Transfer protocol or a Private Information Retrieval protocol is executed with the first server, so that the first server obtains a ciphertext corresponding to the target object ID from the plurality of ciphertexts, and the target object ID is concealed from the second server.

The method shown in FIG. 6 and the method shown in FIG. 2 (or FIG. 3) are the same process implemented on the second server and the first server respectively. Corresponding to the method shown in FIG. 2, in step S606, after the first server obtains a ciphertext corresponding to the target object ID from the plurality of ciphertexts, the first server uses the ciphertext corresponding to the target object ID as an input to the secure multiparty computation protocol on the first server. Corresponding to the method shown in FIG. 3, participating parties of the secure multiparty computation protocol further include a third server, and further, in step S606, after the first server obtains a ciphertext corresponding to the target object ID from the plurality of ciphertexts, the first server sends the ciphertext corresponding to the target object ID to a third server, as an input to the secure multiparty computation protocol on the third server. The implementation of step S602-step S606 may refer to the foregoing description of steps S202-S206 in FIG. 2, and the implementation will not be elaborated here.

Figure 7:
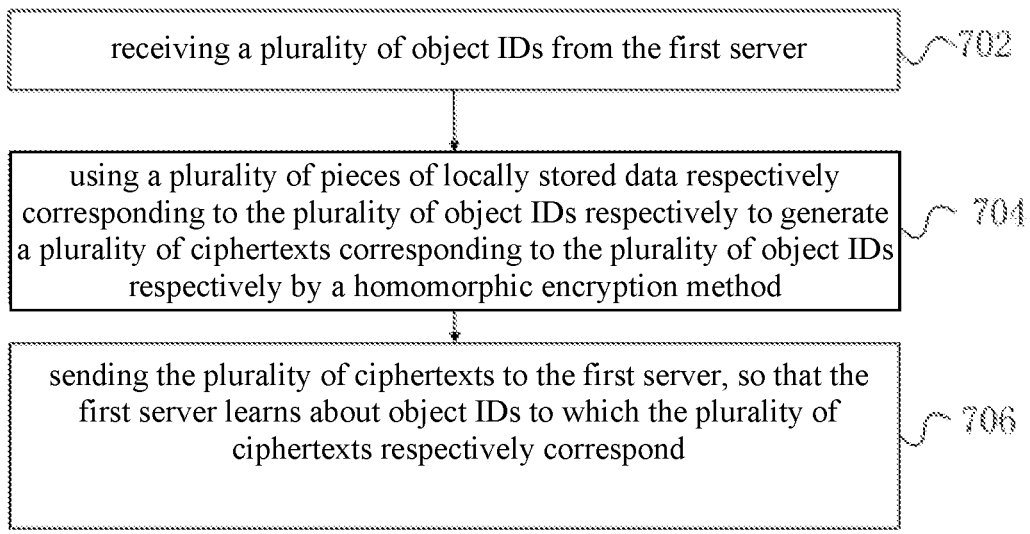
FIG. 7 is a flow chart of a method for obtaining an input of a secure multiparty computation protocol according to another embodiment of the present specification.

FIG. 7 is a flow chart of a method for obtaining an input of a secure multiparty computation protocol according to another embodiment of the present specification, participating parties of the secure multiparty computation protocol include a first server and a second server, and the method is executed on the second server and includes the following steps S702-S706.

In Step S702, a plurality of object IDs are received from the first server, wherein the plurality of object IDs include a target object ID associated with the first server.

In Step S704, a plurality of pieces of locally stored data respectively associated with the plurality of object IDs are used to generate a plurality of ciphertexts respectively associated with the plurality of object IDs by a homomorphic encryption method.

In Step S706, the plurality of ciphertexts are sent to the first server, so that the first server learns about object IDs to which the plurality of ciphertexts respectively correspond.

The method shown in FIG. 7 and the method shown in FIG. 4 (or FIG. 5) are the same process implemented on the second server and the first server respectively. Corresponding to the method shown in FIG. 4, in step S706, after the first server receives the plurality of ciphertexts and object IDs to which the plurality of ciphertexts respectively correspond, the first server uses a ciphertext corresponding to the target object ID as an input to the secure multiparty computation protocol on the first server. Corresponding to the method shown in FIG. 5, participating parties of the secure multiparty computation protocol further include a third server, and further, in step S706, after the first server receives the plurality of ciphertexts and learns about object IDs to which the plurality of ciphertexts respectively correspond, the first server sends a ciphertext corresponding to the target object ID to a third server, as an input to the secure multiparty computation protocol on the third server. The implementation of step S702-step S706 may refer to the foregoing description of steps S402-S408 in FIG. 4, and the implementation will not be elaborated here.

Figure 8:
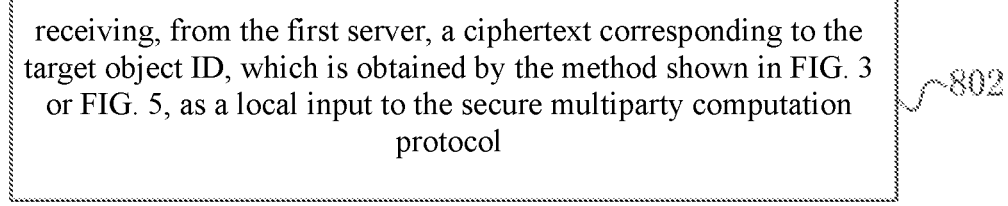
FIG. 8 is a flow chart of a method for obtaining an input of a secure multiparty computation protocol according to another embodiment of the present specification.

FIG. 8 is a flow chart of a method for obtaining an input of a secure multiparty computation protocol according to another embodiment of the present specification, participating parties of the secure multiparty computation protocol include a first server, a second server, and a third server, and the method is executed on the third server and includes Step S802.

In Step S802, a ciphertext corresponding to the target object ID, which is obtained by the method shown in FIG. 3 or FIG. 5, is received from the first server, as a local input to the secure multiparty computation protocol. In some embodiments, the ciphertext corresponding to the target object ID obtained by the method shown in FIG. 3 is one of the following types of ciphertexts: a homomorphic encryption ciphertext, a secret sharing ciphertext, and a ciphertext of a salt value of a garbled circuit.

The method shown in FIG. 8 and the method shown in FIG. 3 (or FIG. 5) are the same process implemented on the third server and the first server respectively. Therefore, the implementation of step S802 may refer to the foregoing description of step S308 in FIG. 3, and the implementation will not be elaborated here.

Figure 9:
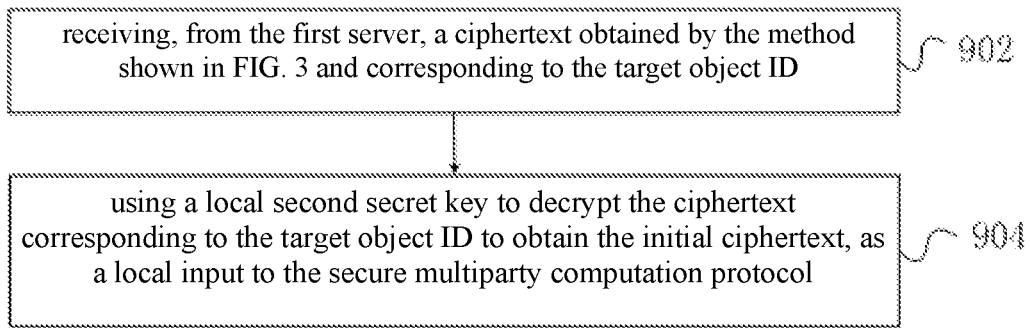
FIG. 9 is a flow chart of a method for obtaining an input of a secure multiparty computation protocol according to another embodiment of the present specification.

FIG. 9 is a flow chart of a method for obtaining an input of a secure multiparty computation protocol according to another embodiment of the present specification, participating parties of the secure multiparty computation protocol include a first server, a second server, and a third server, and the method is executed on the third server and includes the following steps S902-S904.

In Step S902, a ciphertext corresponding to the target object ID, which is obtained by the method shown in FIG. 3 is received from the first server.

In Step S904, a local second key is used to decrypt the ciphertext corresponding to the target object ID to obtain the initial ciphertext, as a local input to the secure multiparty computation protocol.

In some embodiments, the ciphertext corresponding to the target object ID, which is obtained by the method shown in FIG. 3 and received from the first server is a ciphertext obtained from re-encryption of an initial ciphertext by using a first key of the third server. The initial ciphertext is a ciphertext obtained from encrypting the data corresponding to a target object ID by one of the following encryption methods: a homomorphic encryption method, a secret sharing method, and a garbled circuit method. The implementation of step S902-step S904 may refer to the foregoing description of step S308 in FIG. 3, and the implementation will not be elaborated here.

Figure 10:
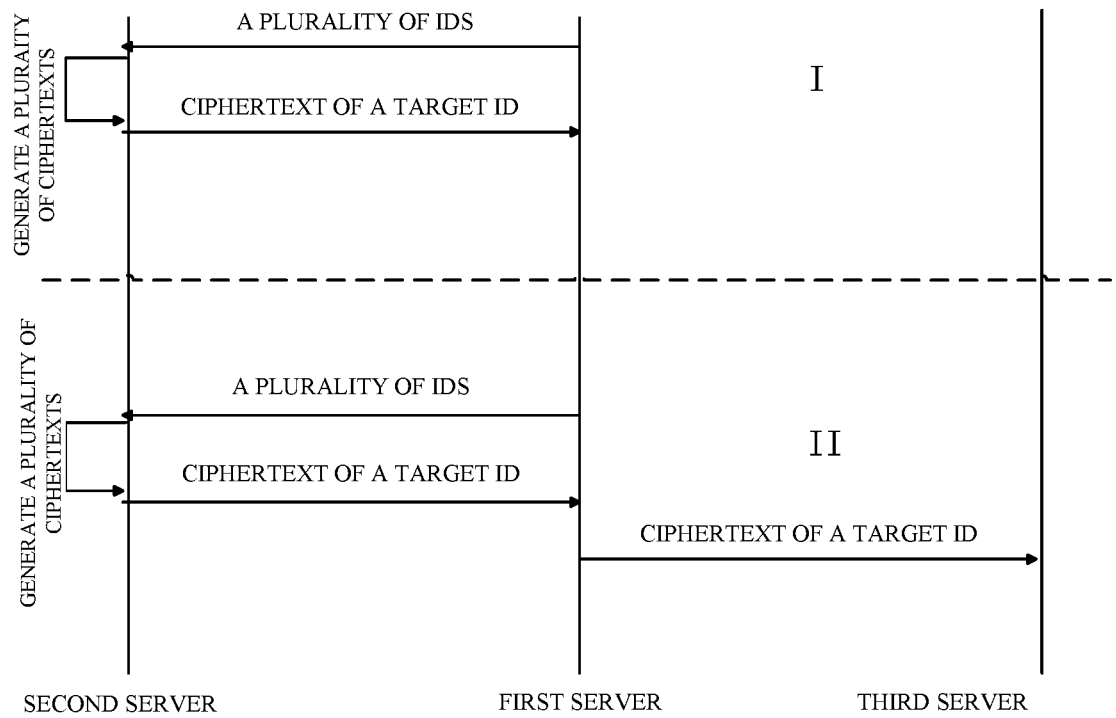
FIG. 10 is a timing sequence chart of a secure multiparty computation method according to an embodiment of the present specification.

FIG. 10 shows a timing sequence chart of a secure multiparty computation method according to an embodiment of the present specification. As shown in FIG. 10, the chart is divided by a dotted line into two parts: I and II. Part I corresponds to the method flowchart shown in FIG. 2 or FIG. 4. For example, in Part I, after a first server obtains a plurality of IDs, the plurality of IDs are sent to a second server; and the second server generates a plurality of ciphertexts corresponding to the plurality of IDs. Then, in the method shown in FIG. 2, the first server and the second server execute, for example, an OT protocol, to enable the first server to obtain the ciphertext of the target ID, as the local input to the secure multiparty computation protocol. In the method shown in FIG. 4, the second server sends the plurality of ciphertexts to the first server and enables the first server to learn about IDs respectively corresponding to a plurality of ciphertexts, thereby enabling the first server to obtain the ciphertext corresponding to the target ID, as the local input to a secure multiparty computation protocol.

Part II corresponds to the method flowchart shown in FIG. 3 or FIG. 5. Firstly, after the first server obtains a plurality of IDs, the first server sends the plurality of IDs to the second server; the second server generates a plurality of ciphertexts corresponding to the plurality of IDs. Then, similar to the foregoing Part I, the first server obtains a ciphertext corresponding to a target ID. Then, the first server sends the ciphertext corresponding to the target ID to the third server, as an input to a secure multiparty computation protocol on the third server. The secure multiparty computation may include ciphertexts inputted at least once by at least one of the foregoing Part I and Part II. The steps of the Part I and Part II may be performed at the same time, or successively and continuously, or intermittently, and may be performed for multiple times.

The first server, the second server, and the third server shown in FIG. 10 are schematic. Participating parties of secure multiparty computation according to an embodiment of the present specification may include any number of servers. For example, the participating parties may further include a fourth server, and similar to the second server or the third server, the fourth server may participate in computation. Therefore, inputs of the secure multiparty computation protocol may include at least one input obtained by other servers (such as the fourth server) through at least one execution of a method provided by the foregoing embodiment with the first server.

Figure 11:
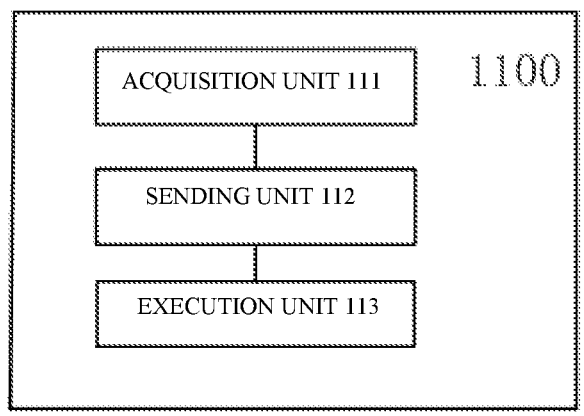
FIG. 11 shows an apparatus 1100 for obtaining an input of a secure multiparty computation protocol according to another embodiment of the present specification.

FIG. 11 shows an apparatus 1100 for obtaining an input of a secure multiparty computation protocol according to another embodiment of the present specification. Participating parties of the secure multiparty computation protocol include a first server and a second server. The apparatus is implemented on the first server and includes: an acquisition unit 111 configured to obtain a plurality of object IDs, wherein the plurality of object IDs include a target object ID associated with the first server, and a plurality of pieces of data respectively associated with the plurality of object IDs are stored in the second server; a sending unit 112 configured to send the plurality of object IDs to the second server; and an execution unit 113 configured to execute an Oblivious Transfer protocol or a Private Information Retrieval protocol with the second server to obtain a ciphertext corresponding to the target object ID from a plurality of ciphertexts generated by the second server, as a local input to the secure multiparty computation protocol, and conceal the target object ID from the second server, wherein the plurality of ciphertexts include a plurality of ciphertexts respectively associated with the plurality of object IDs and generated by the second server by using the plurality of pieces of data.

Figure 12:
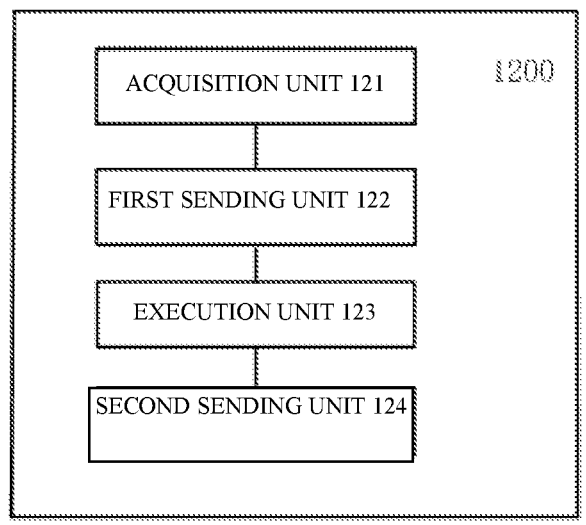
FIG. 12 shows an apparatus 1200 for obtaining an input of a secure multiparty computation protocol according to another embodiment of the present specification.

FIG. 12 shows an apparatus 1200 for obtaining an input of a secure multiparty computation protocol according to another embodiment of the present specification. Participating parties of the secure multiparty computation protocol include a first server, a second server, and a third server. The apparatus is implemented on the first server and includes: an acquisition unit 121 configured to obtain a plurality of object IDs, wherein the plurality of object IDs include a target object ID associated with the first server, and a plurality of pieces of data respectively associated with the plurality of object IDs are stored in the second server; a first sending unit 122 configured to send the plurality of object IDs to the second server; an execution unit 123 configured to execute an Oblivious Transfer protocol or a Private Information Retrieval protocol with the second server to obtain a ciphertext corresponding to the target object ID from a plurality of ciphertexts generated by the second server and conceal the target object ID from the second server, wherein the plurality of ciphertexts include a plurality of ciphertexts respectively associated with the plurality of object IDs and generated by the second server by using the plurality of pieces of data; and a second sending unit 124 configured to send a ciphertext corresponding to the target object ID to the third server.

Figure 13:
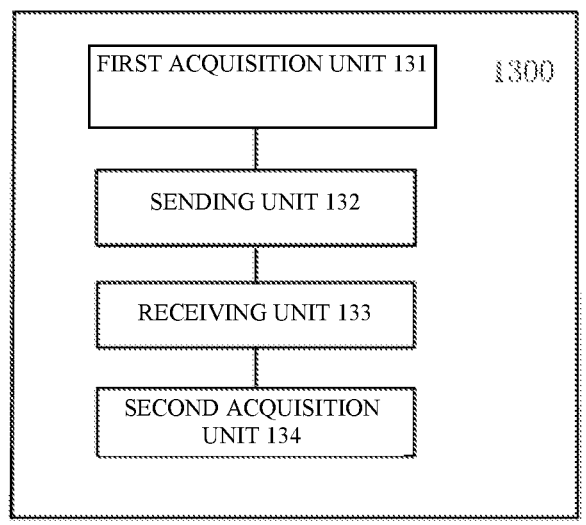
FIG. 13 shows an apparatus 1300 for obtaining an input of a secure multiparty computation protocol according to another embodiment of the present specification.

FIG. 13 shows an apparatus 1300 for obtaining an input of a secure multiparty computation protocol according to another embodiment of the present specification. Participating parties of the secure multiparty computation protocol include a first server and a second server. The apparatus is implemented on the first server and includes: a first acquisition unit 131 configured to obtain a plurality of object IDs, wherein the plurality of object IDs include a target object ID associated with the first server, and a plurality of pieces of data respectively associated with the plurality of object IDs are stored in the second server; a sending unit 132 configured to send the plurality of object IDs to the second server; a receiving unit 133 configured to receive a plurality of ciphertexts from the second server and learn about object IDs to which the plurality of ciphertexts respectively correspond, wherein the plurality of ciphertexts include a plurality of ciphertexts respectively associated with the plurality of object IDs and generated by the second server based on a homomorphic encryption method by using the plurality of pieces of data; and a second acquisition unit 134 configured to obtain a ciphertext corresponding to the target object ID from the plurality of ciphertexts based on object IDs to which the plurality of ciphertexts respectively correspond, as a local input to the secure multiparty computation protocol.

Figure 14:
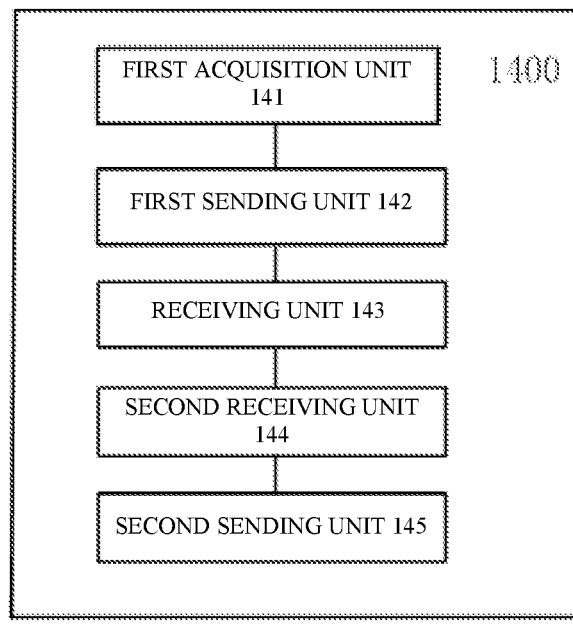
FIG. 14 shows an apparatus 1400 for obtaining an input of a secure multiparty computation protocol according to another embodiment of the present specification.

FIG. 14 shows an apparatus 1400 for obtaining an input of a secure multiparty computation protocol according to another embodiment of the present specification. Participating parties of the secure multiparty computation protocol include a first server, a second server, and a third server. The apparatus is implemented on the first server and includes: a first acquisition unit 141 configured to obtain a plurality of object IDs, wherein the plurality of object IDs include a target object ID associated with the first server, and a plurality of pieces of data respectively associated with the plurality of object IDs are stored in the second server; a first sending unit 142 configured to send the plurality of object IDs to the second server; a receiving unit 143 configured to receive a plurality of ciphertexts from the second server and learn about object IDs to which the plurality of ciphertexts respectively correspond, wherein the plurality of ciphertexts include a plurality of ciphertexts respectively associated with the plurality of object IDs and generated by the second server based on a homomorphic encryption method by using the plurality of pieces of data; a second acquisition unit 144 configured to obtain a ciphertext corresponding to the target object ID from the plurality of ciphertexts based on object IDs to which the plurality of ciphertexts respectively correspond; and a second sending unit 145 configured to send the ciphertext corresponding to the target object ID to the third server.

Figure 15:
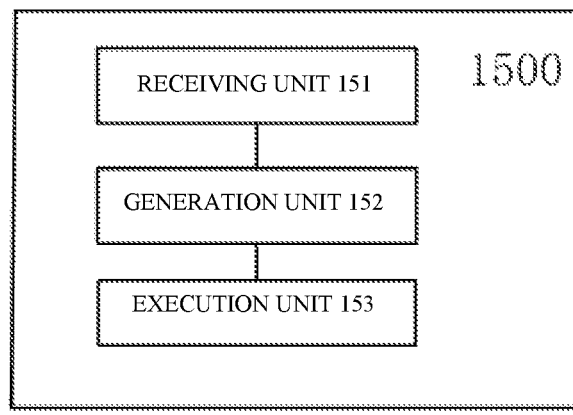
FIG. 15 shows an apparatus 1500 for obtaining an input of a secure multiparty computation protocol according to another embodiment of the present specification.

FIG. 15 shows an apparatus 1500 for obtaining an input of a secure multiparty computation protocol according to another embodiment of the present specification. Participating parties of the secure multiparty computation protocol include a first server and a second server. The apparatus is implemented on the second server and includes: a receiving unit 151 configured to receive a plurality of object IDs from the first server, wherein the plurality of object IDs include a target object ID associated with the first server; a generation unit 152 configured to use a plurality of pieces of locally stored data respectively associated with the plurality of object IDs to generate a plurality of ciphertexts respectively associated with the plurality of object IDs; and an execution unit 153 configured to execute an Oblivious Transfer protocol or a Private Information Retrieval protocol with the first server, so that the first server obtains a ciphertext corresponding to the target object ID from the plurality of ciphertexts and the target object ID is concealed from the second server.

Figure 16:
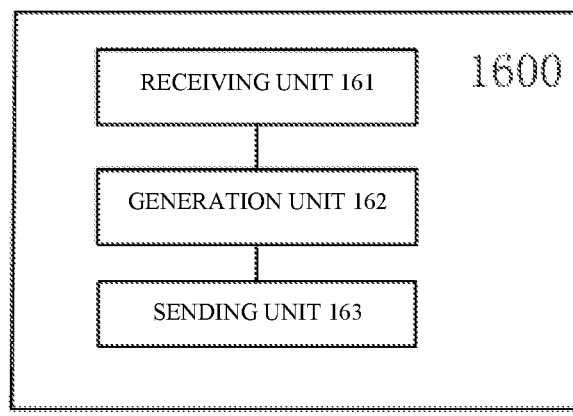
FIG. 16 shows an apparatus 1600 for obtaining an input of a secure multiparty computation protocol according to another embodiment of the present specification.

FIG. 16 shows an apparatus 1600 for obtaining an input of a secure multiparty computation protocol according to another embodiment of the present specification. Participating parties of the secure multiparty computation protocol include a first server and a second server. The apparatus is implemented on the second server and includes: a receiving unit 161 configured to receive a plurality of object IDs from the first server, wherein the plurality of object IDs include a target object ID associated with the first server; a generation unit 162 configured to use a plurality of pieces of locally stored data respectively associated with the plurality of object IDs to generate a plurality of ciphertexts respectively associated with the plurality of object IDs by a homomorphic encryption method; and a sending unit 163 configured to send the plurality of ciphertexts to the first server, so that the first server learns about object IDs to which the plurality of ciphertexts respectively correspond.

Figure 17:
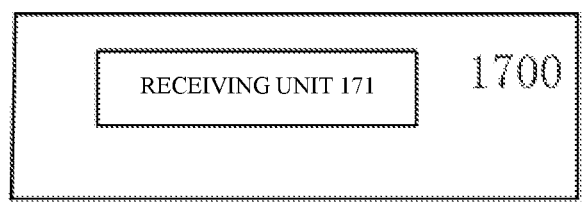
FIG. 17 shows an apparatus 1700 for obtaining an input of a secure multiparty computation protocol according to another embodiment of the present specification.

FIG. 17 shows an apparatus 1700 for obtaining an input of a secure multiparty computation protocol according to another embodiment of the present specification. Participating parties of the secure multiparty computation protocol include a first server, a second server, and a third server. The apparatus is implemented on the third server and includes: a receiving unit 171 configured to receive, from the first server, a ciphertext corresponding to the target object ID obtained by the method shown in FIG. 3 or FIG. 5, as a local input to the secure multiparty computation protocol.

Figure 18:
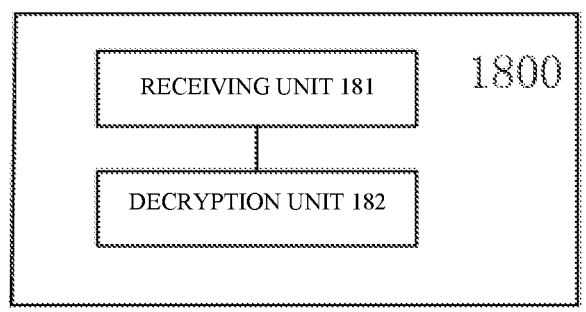
FIG. 18 shows an apparatus 1800 for obtaining an input of a secure multiparty computation protocol according to another embodiment of the present specification.

FIG. 18 shows an apparatus 1800 for obtaining an input of a secure multiparty computation protocol according to another embodiment of the present specification. Participating parties of the secure multiparty computation protocol include a first server, a second server, and a third server. The apparatus is implemented on the third server and includes: a receiving unit 181 configured to receive, from the first server, a ciphertext corresponding to the target object ID obtained by the method shown in FIG. 3; and a decryption unit 182 configured to use a local second key to decrypt the ciphertext corresponding to the target object ID to obtain the initial ciphertext, as a local input to the secure multiparty computation protocol.

Another aspect of the present specification provides a computing device, including a memory and a processor, characterized in that executable codes are stored in the memory and when the processor executes the executable codes, the processor implements any of the foregoing methods.

Through a secure multiparty computation solution according to an embodiment of the present specification, a first server (an evaluator party) conceals an object to be evaluated (a target object) among a plurality of objects and sends the objects to a second server (data source 1); the second server prepares an input of secure multiparty computation for each object among the plurality of objects; the first server obtains a ciphertext of a target object through an OT protocol, a PIR protocol, or a homomorphic encryption method, as a local input of secure multiparty computation, or transfers the ciphertext of the target object to another server (data source 2), and meanwhile the second server is unable to learn about the target object, thereby further protecting the privacy of the target object and improving the security of the secure multiparty computation.

In some embodiments, various units described herein may refer to corresponding modules. The various modules and units of the apparatus (e.g., apparatus 1100, 1200, 1300, 1400, 1500, 1600, 1700, 1800) may be implemented as software instructions or a combination of software and hardware. For example, the apparatus for privacy protection (e.g., apparatus 1100, 1200, 1300, 1400, 1500, 1600, 1700, 1800) may comprise one or more processors (e.g., a CPU) and one or more non-transitory computer-readable storage memories coupled to the one or more processors and configured with instructions executable by the one or more processors to cause one or more components (e.g., the one or more processors) of the system to perform various steps and methods of the modules and units described above (e.g., with reference to the method embodiments). In some embodiments, the apparatus for privacy protection may include a server, a mobile phone, a tablet computer, a PC, a laptop computer, another computing device, or a combination of one or more of these computing devices.

The embodiments of the present specification are described in a progressive manner. The same or similar parts of the embodiments may be mutually referenced. Different embodiments have different focuses of description. For system embodiments that are substantially similar to method embodiments, the description is relatively brief, and the relevant parts may refer to the description of method embodiments.

Embodiments of the present specification are described above. Other embodiments are in the scope of the attached Claims. In some cases, the actions or steps recorded in the Claims may be executed in a sequence different from that given in the embodiments and can still achieve the expected results. Further, it is not necessary for the process described in the attached drawings to require the given sequence or a continuous sequence in order to achieve the expected results. In some embodiments, multitask processing and parallel processing are also acceptable or may be favorable.

Those of ordinary skill should further understand that the examples of units and algorithm steps described with reference to the embodiments disclosed in this document can be achieved through electronic hardware, computer software, or a combination of the two. Whether these functions are executed by hardware or software depends on applications and design constraints of a technical solution. Those of ordinary skill may use different methods to achieve described functions for every application, but such achievement shall still be deemed within the scope of the present application.

The steps of the methods or algorithms described with reference to the embodiments disclosed in this document may be executed through hardware, software modules executed by a processor, or a combination of the two. The software modules may be arranged in a random access memory (RAM), an internal memory, a read-only memory (ROM), an electrically programmable ROM, an electrically erasable and a programmable ROM, a register, a hard disk, a removable disk, a CD-ROM, or any other forms of storage media.

The foregoing exemplary implementations describe in detail the objectives, technical solutions, and beneficial effects of the application. The foregoing descriptions are only implementations and are not intended to limit the scope of protection of the application. Any modifications, equivalent replacements and improvements made without departing from the spirit and principle of the application shall fall within the scope of the application.

The invention claimed is:

1. A method for privacy protection, wherein the method is performed by a first computer device and comprises:
obtaining a plurality of object IDs, wherein the plurality of object IDs include a target object ID;
sending the plurality of object IDs to a second computer device storing a plurality of pieces of data respectively associated with the plurality of object IDs for the second computer device to generate a plurality of ciphertexts respectively based on the plurality of pieces of data, wherein the plurality of ciphertexts generated by the second computer device comprise a ciphertext associated with the target object ID and one or more different ciphertexts associated with one or more different object IDs of the plurality of object IDs;
by executing a cryptography protocol with the second computer device, obtaining the ciphertext associated with the target object ID from the plurality of ciphertexts generated by the second computer device without obtaining the one or more different ciphertexts,
wherein which of the plurality of object IDs being the target object ID obtained by the first computer device is unknown to the second computer device, and
wherein the first computer device is unable to decrypt the ciphertext to determine the plurality of pieces of data; and
sending the obtained ciphertext associated with the target object ID to a third computer device as an input to a secure multiparty computation protocol while concealing the target object ID from the third computer device.

2. The method of claim 1, wherein:
the cryptography protocol comprises an Oblivious Transfer protocol.

3. The method of claim 1, wherein:
the cryptography protocol comprises a Private Information Retrieval protocol.

4. The method of claim 1, wherein the plurality of ciphertexts comprise one of the following types of ciphertexts:
a homomorphic encryption ciphertext, a secret sharing ciphertext, and a ciphertext of a salt value of a garbled circuit.

5. The method of claim 1, wherein:
executing the cryptography protocol comprises executing the cryptography protocol for one or more times.

6. The method of claim 1, further comprising:
inputting the obtained ciphertext associated with the target object ID to a secure multiparty computation protocol between the first computer device and the second computer device.

7. The method of claim 1, further comprising:
wherein participating parties of the secure multiparty computation protocol comprise the first computer device, the second computer device, and the third computer device.

8. The method of claim 1, wherein sending the obtained ciphertext associated with the target object ID to the third computer device comprises:
sending the ciphertext associated with the target object ID to the third computer device for the third computer device to decrypt the ciphertext associated with the target object ID to obtain an initial ciphertext as the input to the secure multiparty computation protocol, wherein participating parties of the secure multiparty computation protocol comprise the first computer device, the second computer device, and the third computer device.

9. The method of claim 8, wherein:
the ciphertext associated with the target object ID is encrypted by the second computer device based on the initial ciphertext with a first key of the third computer device; and
sending the ciphertext associated with the target object ID to the third computer device for the third computer device to decrypt the ciphertext associated with the target object ID comprises: sending the ciphertext associated with the target object ID to the third computer device for the third computer device to decrypt the ciphertext associated with the target object ID with a second key.

10. The method of claim 9, wherein the initial ciphertext is encrypted based on the target ID by one of the following encryption methods: a homomorphic encryption method, a secret sharing method, and a garbled circuit method.

11. A system for privacy protection, wherein the system acts as a first computer device and comprises one or more processors and one or more non-transitory computer-readable memories coupled to the one or more processors and configured with instructions executable by the one or more processors to cause the system to perform operations comprising:
obtaining a plurality of object IDs, wherein the plurality of object IDs include a target object ID;
sending the plurality of object IDs to a second computer device storing a plurality of pieces of data respectively associated with the plurality of object IDs for the second computer device to generate a plurality of ciphertexts respectively based on the plurality of pieces of data, wherein the plurality of ciphertexts generated by the second computer device comprise a ciphertext associated with the target object ID and one or more different ciphertexts associated with one or more different object IDs of the plurality of object IDs;
by executing a cryptography protocol with the second computer device; obtaining the ciphertext associated with the target object ID from the plurality of ciphertexts generated by the second computer device without obtaining the one or more different ciphertexts,
wherein which of the plurality of object IDs being the target object ID obtained by the first computer device is unknown to the second computer device, and
wherein the first computer device is unable to decrypt the ciphertext to determine the plurality of pieces of data; and
sending the obtained ciphertext associated with the target object ID to a third computer device as an input to a secure multiparty computation protocol while concealing the target object ID from the third computer device.

12. The system of claim 11, wherein:
the cryptography protocol comprises an Oblivious Transfer protocol.

13. The system of claim 11, wherein:
the cryptography protocol comprises a Private Information Retrieval protocol.

14. The system of claim 11, wherein the plurality of ciphertexts comprise one of the following types of ciphertexts:
a homomorphic encryption ciphertext, a secret sharing ciphertext, and a ciphertext of a salt value of a garbled circuit.

15. The system of claim 11, wherein:
executing the cryptography protocol comprises executing the cryptography protocol for one or more times.

16. The system of claim 11, wherein the operations further comprise:
inputting the obtained ciphertext associated with the target object ID to a secure multiparty computation protocol between the first computer device and the second computer device.

17. The system of claim 11,
wherein participating parties of the secure multiparty computation protocol comprise the first computer device, the second computer device, and the third computer device.

18. A method for privacy protection, wherein the method is performed by a second computer device and comprises:
receiving a plurality of object IDs from a first computer device, wherein the plurality of object IDs include a target object ID;
encrypting a plurality of pieces of data respectively associated with the plurality of object IDs to generate a plurality of ciphertexts respectively associated with the plurality of object IDs, wherein the generated plurality of ciphertexts comprise a ciphertext associated with the target object ID and one or more different ciphertexts associated with one or more different object IDs of the plurality of object IDs; and
executing a cryptography protocol with the first computer device for the first computer device to obtain the ciphertext associated with the target object ID from the plurality of ciphertexts without obtaining the one or more different ciphertexts,
wherein which of the plurality of object IDs being the target object ID obtained by the first computer device is unknown to the second computer device, and
wherein the first computer device is unable to decrypt the ciphertext to determine the plurality of pieces of data.

19. The method of claim 18, wherein:
the cryptography protocol comprises an Oblivious Transfer protocol.

20. The method of claim 18, wherein:
the cryptography protocol comprises a Private Information Retrieval protocol.

* * * * *